US011322761B2

(12) United States Patent
Detmar et al.

(10) Patent No.: US 11,322,761 B2
(45) Date of Patent: May 3, 2022

(54) METHOD FOR RELEASING A FUEL CELL SYSTEM AND FUEL CELL SYSTEM

(71) Applicant: Bayerische Motoren Werke Aktiengesellschaft, Munich (DE)

(72) Inventors: Christopher Detmar, Munich (DE); Andreas Pelger, Ismaning (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 78 days.

(21) Appl. No.: 16/764,906

(22) PCT Filed: Dec. 6, 2018

(86) PCT No.: PCT/EP2018/083742
§ 371 (c)(1),
(2) Date: May 18, 2020

(87) PCT Pub. No.: WO2019/121030
PCT Pub. Date: Jun. 27, 2019

(65) Prior Publication Data
US 2020/0343568 A1    Oct. 29, 2020

(30) Foreign Application Priority Data

Dec. 20, 2017    (DE) ..................... 10 2017 223 452.0

(51) Int. Cl.
*H01M 8/04*       (2016.01)
*H01M 8/04746*    (2016.01)
*H01M 8/0438*     (2016.01)

(52) U.S. Cl.
CPC ... *H01M 8/04753* (2013.01); *H01M 8/04402* (2013.01); *H01M 2250/20* (2013.01)

(58) Field of Classification Search
CPC ..................... H01M 8/04402; H01M 8/04753
(Continued)

(56) References Cited

U.S. PATENT DOCUMENTS

2006/0110640 A1    5/2006  Yoshida et al.
2007/0243426 A1   10/2007  Bono
(Continued)

FOREIGN PATENT DOCUMENTS

DE    11 2004 000 811 T5    3/2006
DE    11 2006 001 940 T5    5/2008
(Continued)

OTHER PUBLICATIONS

International Search Report (PCT/ISA/210) issued in PCT Application No. PCT/EP2018/083742 dated Mar. 29, 2019 with English translation (four (4) pages).
(Continued)

*Primary Examiner* — James M Erwin
(74) *Attorney, Agent, or Firm* — Crowell & Moring LLP (57) ABSTRACT

A method for enabling a fuel cell system includes the steps of: i) detecting a pressure value, which is indicative of the pressure within a section of the anode sub-system, wherein the section begins downstream of a pressure reducer; ii) relieving the pressure of the section during a pressure relief time interval, if the pressure value is greater than a pressure limit value and a release request is present; and then iii) enabling the fuel cell system if the pressure value in the section after the pressure relief is less than the pressure limit value.

14 Claims, 3 Drawing Sheets

(58) Field of Classification Search
USPC .......................................................... 429/444
See application file for complete search history.

(56) References Cited

U.S. PATENT DOCUMENTS

| | | | |
|---|---|---|---|
| 2010/0143813 A1 | 6/2010 | Goebel et al. | |
| 2010/0151343 A1 | 6/2010 | Katano et al. | |
| 2015/0337769 A1* | 11/2015 | Yoshioka .............. | F02D 19/022 137/512 |
| 2018/0342748 A1 | 11/2018 | Hartmann et al. | |

FOREIGN PATENT DOCUMENTS

| | | |
|---|---|---|
| DE | 10 2011 010 482 A1 | 3/2012 |
| DE | 11 2005 001 162 B4 | 11/2013 |
| DE | 10 2015 223 020 A1 | 5/2017 |

OTHER PUBLICATIONS

German-language Written Opinion (PCT/ISA/237) issued in PCT Application No. PCT/EP2018/083742 dated Mar. 29, 2019 (six (6) pages).
German-language Search Report issued in German Application No. 102017223452.0 dated Oct. 22, 2018 with partial English translation (11 pages).

* cited by examiner

METHOD FOR RELEASING A FUEL CELL SYSTEM AND FUEL CELL SYSTEM

BACKGROUND AND SUMMARY OF THE INVENTION

The technology disclosed herein relates to a method for enabling a fuel cell system, and to a fuel cell system which is set up to carry out the methods disclosed herein.

Fuel cell vehicles per se are known. In the case of a fuel cell vehicle, the fuel is stored in a pressure vessel under high pressure. During operation, the fuel has to be fed to the fuel cell stack within a considerably smaller pressure range. The change of the pressure takes place via what is known as a pressure regulator or pressure reducer. The region downstream of the pressure regulator is often called a medium pressure region. A further pressure reducer can be installed between the pressure reducer and the fuel cell stack, which further pressure reducer lowers the pressure further to a low pressure. In order to protect the components in the medium pressure region and as a safety measure, the tank shut-off valve and possibly an anode shut-off valve are closed if an upper limit of the permitted pressure in the medium pressure region is exceeded. In addition, a pressure relief valve is as a rule installed in the medium pressure region, which pressure relief valve triggers in the case of further exceeding.

If the motor vehicle is then parked for a relatively long time, it can occur that a pressure value is set in the medium pressure region, at which pressure value the abovementioned valves already remain closed, but the pressure relief valve is not yet triggered. This can be caused, for example, by way of minimum leaks at the pressure regulator and/or by way of an increase of the ambient temperature. In this case, the controller of the fuel cell system does not issue an enabling signal. In other words, on account of the pressure in the medium pressure region, the controller does not allow the motor vehicle to be started, although there is no malfunction here. In the case of previously known solutions, the controller is not capable of making a distinction between a malfunction and a tolerable pressure rise.

It is one preferred object of the technology disclosed herein to reduce or to eliminate at least one disadvantage of a previously known solution or to propose an alternative solution. In particular, it is one preferred object of the technology disclosed herein to provide a method and a motor vehicle, in the case of which a pressure rise in the anode subsystem downstream of the pressure reducer, which pressure rise does not result from a malfunction and is therefore tolerable, does not prevent the starting of the motor vehicle. Further preferred objects can arise from the advantageous effects of the technology disclosed herein. The object/objects is/are achieved by way of the subject matter of the independent patent claims. The dependent claims represent preferred refinements.

The object is achieved, in particular, by way of a method for enabling a fuel cell system, and by way of a fuel cell system which is set up to carry out one of the methods disclosed herein.

The technology disclosed herein relates to a fuel cell system with at least one fuel cell. The fuel cell system is intended, for example, for mobile applications such as motor vehicles (for example, passenger motor vehicles, motorcycles, commercial vehicles), in particular for the provision of the energy for at least one drive machine for the propulsion of the motor vehicle. In its simplest form, a fuel cell is an electrochemical energy converter which converts fuel and oxidizing agent into reaction products and in the process produces electricity and heat. The fuel cell comprises an anode and a cathode which are separated by way of an ion-selective or ion-permeable separator. The anode is supplied with fuel. Preferred fuels are: hydrogen, low molecular weight alcohol, biofuels, or liquefied natural gas. The cathode is supplied with oxidizing agent. Preferred oxidizing agents are, for example, air, oxygen and peroxides. The ion-selective separator can be configured, for example, as a proton exchange membrane (PEM). A cation-selective polymer electrolyte membrane is preferably used. Materials for a membrane of this type are, for example: Nafion®, Flemion® and Aciplex®. As a rule, a plurality of fuel cells are combined to form a fuel cell stack.

The fuel cell system comprises an anode subsystem which is configured by the fuel-conducting components of the fuel cell system. An anode subsystem can have at least one pressure vessel, at least one tank shut-off valve, at least one pressure reducer, at least one anode inflow path which leads to the anode inlet of the fuel cell stack, an anode space in the fuel cell stack, at least one recirculation flow path which leads away from the anode outlet of the fuel cell stack, at least one water separator, at least one anode flush valve, at least one active or passive fuel recirculation conveyor, and further elements. A main object of the anode subsystem is the conducting and distribution of fuel to the electrochemically active surfaces of the anode space and the discharge of anode exhaust gas. The fuel cell system comprises a cathode subsystem. The cathode subsystem is formed from the components which conduct oxidizing agent. A cathode subsystem can have at least one oxidizing agent conveyor, at least one cathode inflow path which leads to the cathode inlet, at least one cathode exhaust gas path which leads away from the cathode outlet, a cathode space in the fuel cell stack, and further elements. A main object of the cathode subsystem is the conducting and distribution of oxidizing agent to the electrochemically active surfaces of the cathode space and the discharge of unused oxidizing agent.

The technology disclosed herein comprises, furthermore, at least one pressure reducer. The pressure reducer is arranged downstream of the at least one pressure vessel and upstream of the at least one fuel cell in the anode subsystem. The pressure reducer is configured to reduce the fuel inlet pressure which prevails at the inlet of the pressure reducer to a fuel outlet pressure or downstream pressure which prevails at the outlet of the pressure reducer. In the simplest case, this can be a throttle here. As a rule, the pressure reducer comprises a pressure reducing valve which, despite different inlet pressures, ensures that a defined outlet pressure is not exceeded on the outlet side. The fuel expands in the pressure reducer. A first pressure reducer and, downstream, a second or further pressure reducer are preferably used.

In one refinement of the technology disclosed herein, the enabling of the fuel cell system can comprise the step, according to which a fuel cell system can be transferred after the enabling from an inactive state (that is to say, a phase of non-use), in which it does not provide any energy to any possible consumers, into an active operating state, in which it can provide electric energy to any possible external energy consumers. It is provided in one preferred refinement that the tank shut-off valve disclosed herein cannot be actuated in a non-enabled state of the fuel cell system until the enabling of the fuel cell system takes place. The tank shut-off valve can no longer be opened in the shut-off state. Here, there is no mechanical blockage of the tank shut-off valve, but rather all other signals which want to open the tank shut-off valve are overwritten until the enabling. In other words, the tank shut-off valve can therefore be opened only if there is an enabling.

An enabling request is a direct or indirect request for the enabling of the fuel cell system, for example if a user wishes to start a fuel cell system or a fuel cell motor vehicle. A request of this type can also take place indirectly. It can be provided, for example, that even the door unlocking operation is evaluated by the motor vehicle as an enabling request of the fuel cell system. An enabling request of this type can initiate a starting procedure of the fuel cell system.

The method disclosed herein expediently comprises the step: detecting of a pressure value which is indicative of the pressure within a section of the anode subsystem, the section beginning downstream of a pressure reducer.

The section as a rule ends upstream of the at least one fuel cell of the fuel cell system or upstream of the fuel cell stack. A further or second pressure reducer is as a rule provided between the abovementioned first pressure reducer and the at least one fuel cell. In one refinement, the section has a medium pressure level which is lower than the pressure level upstream of the first pressure reducer, and which is higher than the pressure level downstream of the second pressure reducer. In a refinement of this type, the section can also be called a medium pressure region. It is also conceivable, however, that merely one pressure reducer is used.

The pressure value is indicative of the pressure within the section. In one refinement, the pressure value can directly be a signal of a pressure sensor which is arranged in the section. In another refinement, the pressure value can be determined indirectly, for example by way of detecting another variable.

In accordance with the technology disclosed herein, the pressure value is expediently determined during an inactive phase of the fuel cell system, during which phase the fuel cell system does not provide any electric energy to an electric consumer. In particular, the pressure value is detected at a time, at which the tank shut-off valve of the pressure vessel system is closed. Further expediently, no fuel is removed from the fuel cell system or the section at the time at which the pressure value is detected. An anode shut-off valve upstream of the fuel cell stack in the anode inflow path is expediently closed during the detecting of the pressure value.

Furthermore, the technology disclosed herein comprises the step: pressure relieving of the section if the pressure value is greater than a pressure limit value and there is an enabling request.

Here, the pressure relieving comprises defined operations which lead to a pressure decrease in the case of a fuel cell system which is intact or damaged to a tolerable extent.

The pressure relieving is preferably carried out for the time duration of a pressure relieving time interval. The pressure relieving time interval is a defined time period or a defined duration. This pressure relieving time interval is as a rule constant and can be, for example, 5 seconds or 10 seconds or 30 seconds or one minute. The pressure relieving time interval is preferably selected to be as short as possible, with the result that the fuel cell system can be started as rapidly as possible. The pressure relieving time interval is so long, however, that pressure relieving can be achieved in every case if there is no damage of the fuel cell system. The pressure relieving time interval is dependent, in particular, on the type of pressure relieving. This does not have to be realized in this way, however. It is likewise conceivable that the controller continuously compares the pressure value with the pressure limit value.

Here, the pressure limit value is a value which is indicative of a limit pressure in the section which is disclosed herein.

The limit pressure is a pressure which lies above the normal operating pressure of the section. Here, the normal operating pressure of the section is the pressure which is present during regular or active operation of the fuel cell system (that is to say, operation which provides energy) or during the inactive phase (for example, while parking overnight).

In one preferred refinement, that pressure is selected as limit pressure, from which the tank shut-off valve is not enabled (that is to say, is shut off) independently of the operating state of the fuel cell system. A pressure limit value of this type and a shut-off function of this type are as a rule provided, in order that the fuel cell system is not operated further in the case of a malfunction.

If the pressure value before the pressure relieving which is disclosed herein lies above the pressure limit value, a check is made in accordance with the technology disclosed herein as to whether a pressure rise which has possibly occurred in the section during the inactive phase of the fuel cell system is tolerable. If the pressure value in the meantime lies below the pressure limit value, there is no critical pressure rise and the enabling can be issued. The method disclosed herein can comprise the step, according to which the pressure relieving is not carried out and the enabling already takes place after the detecting of the pressure value if the detected pressure value is smaller than the pressure limit value. If this is the case, no significant pressure rise took place during the inactive phase.

The method disclosed herein comprises the step: enabling of the start of the fuel cell system if the pressure value in the section after the pressure relieving is smaller than the pressure limit value. Here, the enabling can comprise, in particular, the step, according to which the at least one tank shut-off valve is enabled. After the enabling, the at least one tank shut-off valve can be opened for the start of the fuel cell system. Furthermore, the method disclosed herein can comprise the step, according to which the fuel cell system is enabled if the pressure value in the section after the pressure relieving is smaller than the maximum operating pressure limit value which may occur during the energy-providing active operation of the fuel cell system. Sometimes, therefore, a low value can be selected as the limit value as the limit pressure, from which the tank shut-off valve is shut off.

The method disclosed herein can comprise the step, according to which a check is made before the pressure relieving and after the enabling request as to whether any possible tank shut-off valves (that is to say, the tank shut-off valve or all the tank shut-off valves if a plurality are provided) upstream of the pressure reducer/reducers are closed, and the pressure relieving of the section taking place only if the possible tank shut-off valves are closed. This therefore advantageously ensures that the fuel does not flow out in an unimpeded manner in the case of a defect at the pressure reducer.

The pressure relieving can be realized in different ways. In one refinement, a discharge valve is connected fluidically to the section disclosed herein. The fuel can escape into the surroundings through the discharge valve. It can be provided in accordance with the technology disclosed herein that the pressure relieving takes place by virtue of the fact that the fuel flows out of the section directly or indirectly into the anode of the fuel cell stack of the fuel cell system. To this end, the anode shut-off valve of the anode inflow line can be opened. As an alternative or in addition, it can be provided that the pressure relieving takes place by virtue of the fact that the fuel flows out of the section directly or indirectly into an exhaust gas system of the fuel cell system. The exhaust gas system can be configured, for example, by way of the cathode exhaust gas path. It can be provided in accordance with the technology disclosed herein that the fuel which is discharged during the pressure relieving is converted catalytically on a catalytic converter surface. To this end, it can be provided, for example, that catalytic converter surfaces are attached in an exhaust gas path. It can be provided in one refinement that the fuel to be discharged is fed via an exhaust gas line to the cathode of the fuel cell stack. In one preferred refinement, the fuel which is to be discharged during the pressure relieving escapes via an anode flush valve and an anode flush line into the cathode exhaust gas system. An anode flush valve of this type and an anode flush line are expediently used to flush (=purge) the anode subsystem, in order to remove water and nitrogen from the subsystem in this way. The fuel cell system preferably operates the oxidizing agent conveyor at least during the pressure relieving in such a way that the fuel which is to be discharged during the pressure relieving is diluted with ambient air which is conveyed by the oxidizing agent conveyor, before the fuel leaves the fuel cell system.

The technology disclosed herein relates as it were to a motor vehicle (for example, passenger motor vehicles, motorcycles, commercial vehicles) with the fuel cell system disclosed herein.

All the features which are described here in conjunction with the method shown here are to be disclosed as it were as structural features of the fuel cell system or the at least one controller which can be set up in each case accordingly.

The system disclosed herein comprises at least one control unit. The control unit is set up, inter alia, to carry out the method steps disclosed herein. To this end, based on provided signals, the control unit can at least partially and preferably completely regulate ("closed loop control") or control ("open-loop control") the actuators in the system. The control unit can influence at least the fuel cell system, in particular the cathode subsystem, the anode subsystem and/or the cooling system of the fuel cell system. As an alternative or in addition, the control unit can also be integrated into another control unit, for example into a superordinate control unit. The control unit can interact with further control units of the motor vehicle.

The pressure vessel can be, for example, a high pressure gas vessel (=CGH2). High pressure gas vessels are configured to store fuel in the long term at ambient temperatures at a nominal operating pressure (also called "nominal working pressure" or NWP) of approximately 350 bar(g) (=positive pressure with respect to atmospheric pressure), further preferably of approximately 700 bar(g) or more. A cryogenic pressure vessel is suitable for storing the fuel at the above-mentioned operating pressures even at temperatures which lie considerably below the operating temperature of the motor vehicle.

Furthermore, the technology disclosed herein relates to a tank shut-off valve. The tank shut-off valve is the valve, the inlet pressure of which corresponds (substantially) to the vessel pressure. The tank shut-off valve is, in particular, a valve which can be controlled or regulated and, in particular, is normally closed. The tank shut-off valve is as a rule integrated into an On Tank Valve (=OTV). The on tank valve is the valve unit which is mounted directly at one end of the pressure vessel and is fluidically connected directly to the interior of the pressure vessel. A tank shut-off valve of this type is also called a first valve in the EU Directive No. 406/2010 of the Commission of Apr. 26, 2010 pursuant to the EC Directive No. 79/2009 of the European Parliament and the Council concerning the type approval of motor vehicles operated by hydrogen.

In other words, the technology disclosed herein relates to a fuel cell system and to a method for starting a fuel cell system.

In the case of the technology disclosed herein, the at least one fuel cell of the fuel cell system is set up in one refinement to briefly reduce a pressure in the medium pressure region above the pressure limit value to a pressure in the normal range (=below the pressure limit value). If, however, starting was carried out "normally" afterward and the tank shut-off valves were opened afterward, it could not be detected whether the pressure relief valve will trigger and fuel will escape in an uncontrolled manner if there is a malfunction (for example, the pressure regulator has a leak or regulates incorrectly). This malfunction might lead to the safety functions kicking in and it being necessary for the fuel cell system to be switched off (emergency stop). If the pressure in the medium pressure region is above the pressure limit value, the system in accordance with the technology disclosed herein can be started as follows:

First of all, the tank shut-off valves remain closed (secure state).

The at least one fuel cell then reduces the pressure in the medium pressure region (=section) until the pressure is in the normal range. The at least one fuel cell expediently reduces the pressure, without the fuel cell already providing electric energy to an energy consumer (that is to say, the fuel cell has not yet started). For pressure relieving from the medium pressure region, fuel can preferably be removed from said section and can be fed to the remaining anode subsystem or an exhaust gas section of the fuel cell system. To this end, for example, small quantities of a few milligrams of fuel (quantity dependent on the line volume) can be discharged either into the anode from the fuel cell stack or via a bypass directly into the exhaust gas section, until the pressure is reduced to a pressure which is permissible for the regulating operation of the fuel cell system. If the fuel is discharged into the exhaust gas section, the oxidizing agent conveyor can feed in ambient air to reduce the fuel concentration in the exhaust gas section.

If the pressure in the medium pressure region decreases to a value below the pressure limit value or if the pressure value after the pressure relieving of the medium pressure region lies in the normal range, the normal starting procedure of the fuel cell can be initiated and the tank shut-off valves can be opened or enabled.

If there is a defect, the pressure in the medium pressure region does not decrease and the switch-off points which are defined for the operation kick in, and the tank shut-off valves are closed if the permissible pressure value is exceeded in the medium pressure region.

Exceeding of the pressure values which are permissible for the regulating operation (that is to say, exceeding of the normal range) and triggering of the pressure relief valve and therefore defects in the system can advantageously be detected precisely, and safety measures can be introduced. Furthermore, gradual faults can be detected. The availability of the motor vehicle can preferably be increased.

If there is a malfunction at the transition from the high pressure region to the medium pressure region (that is to say, at the pressure reducer), the medium pressure cannot be reduced significantly via the pressure relieving disclosed herein. The small discharge of hydrogen is insufficient to decrease the pressure sufficiently, since fuel flows in continuously from the high pressure region. The malfunction is already detected before opening of the tank shut-off valves, and the tank shut-off valves are not opened. Therefore, only comparatively small quantities of fuel flow out.

Furthermore, the technology disclosed herein relates to a method for checking the tightness of a section of an anode subsystem downstream in a pressure reducer, in the case of which method a pressure value is detected at time intervals during an inactive phase of the fuel cell system, which pressure value is indicative of the pressure in the section, the pressure change being determined from the values which are detected at time intervals, and the pressure change being used as a measure of the tightness. The method can comprise the step, according to which the ambient temperature change is detected at the same time as the detected pressure value, and with temperature-induced pressure value changes being taken into consideration during the detection of the tightness. In other words, a check can therefore be carried out regularly as to whether the tightness requirements of the system are being maintained. A gradual deterioration of the system can be detected via the parameter "pressure rise over a parking duration" (with considerations of the temperatures in the system during the parking time). As a result, measures (for example, maintenance) can be initiated in a timely manner, before a malfunction might occur during operation.

The technology disclosed herein will now be described on the basis of the figures.

DETAILED DESCRIPTION OF THE DRAWINGS

Figure 1:
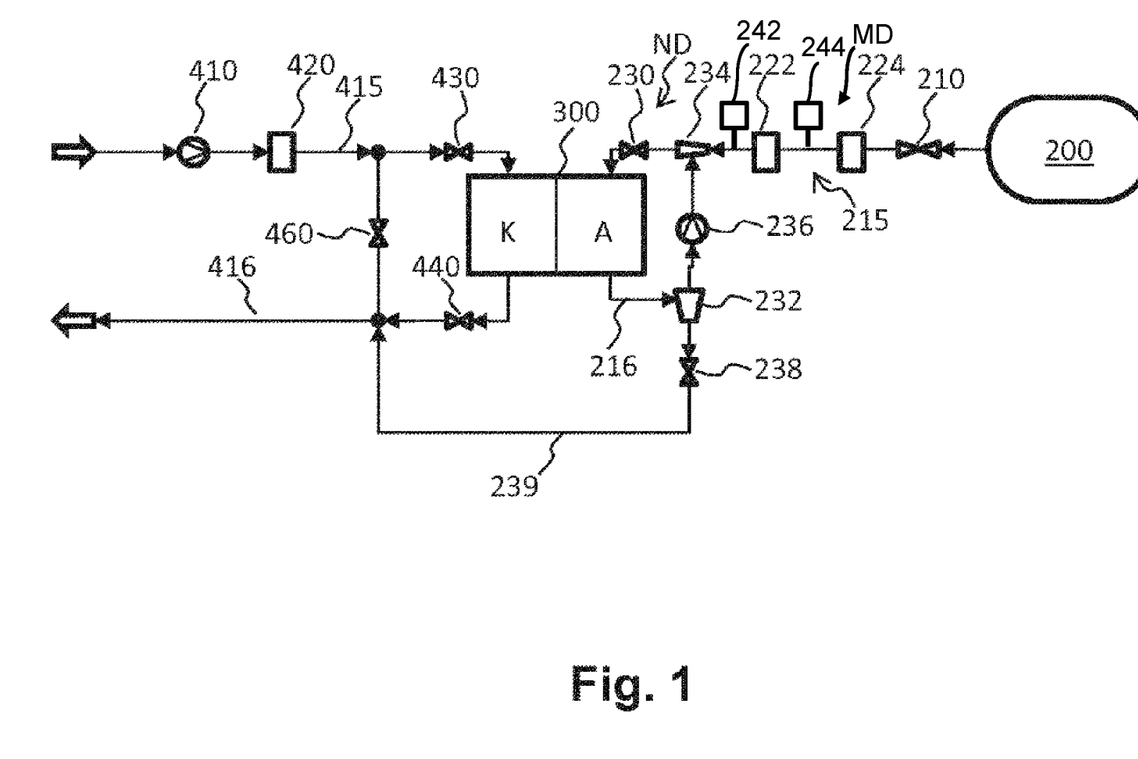
FIG. 1 is a schematic illustration of a fuel cell system.

FIG. 1 diagrammatically shows the fuel cell system disclosed herein. Fuel, for example hydrogen at 700 bar, is stored in the pressure vessel 200. The pressure vessel 200 provides hydrogen for a fuel cell stack 300 with a multiplicity of fuel cells which are operated at a lower pressure level, for example from 0.5 to 1 bar(g) (=positive pressure with respect to atmospheric pressure). A tank shut-off valve 210 is provided at one end of the pressure vessel 200. Instead of merely one pressure vessel 200 with one tank shut-off valve 210, a plurality of pressure vessels 200 with a plurality of tank shut-off valves 210 might likewise be provided. In the system which is shown here, furthermore, two pressure stages are provided which operate in each case by way of a pressure reducer 222, 224. The first pressure stage lowers the pressure from 700 bar to a medium pressure level of, for example, from 10 to 20 bar or from 13 to 16 bar (medium pressure range). The second pressure stage lowers the pressure from the medium pressure level to the low pressure of the fuel cells. The region downstream of the first pressure reducer 224 is the section MD disclosed herein. The latter is divided further here into a medium pressure region MD and a low pressure region ND. Here, a mechanical proportional pressure regulator is used as first pressure reducer 224. Various technologies for the second pressure regulator 222 can be used in the second pressure stage, for example injectors, Venturi nozzles and mechanical pressure regulators. In order to prevent bursting of the pipelines in the case of a malfunction in the pressure reducers 222, 224, in each case one pressure relief valve 242, 244 is provided here downstream of the first and the second pressure reducer 222, 224. Here, a water separator 232, an anode flush valve 238, a recirculation pump 236 and a Venturi nozzle 234 are provided in the recirculation circuit in the anode subsystem downstream of the fuel cell stack 300. Here, the anode flush line 239 connects the anode flush valve 238 to the cathode exhaust gas line 416 which begins downstream of the cathode K of the fuel cell stack 300 and ends in the surroundings. A catalytic converter surface (not shown) can be provided in said exhaust gas line 416.

In a further refinement, the anode flush line 239 opens upstream of the cathode into the cathode feed line 415, in particular downstream of the cathode-side stack shut-off valve 430. It can advantageously be provided that the catalytic conversion of the fuel takes place during the pressure relieving in the section MD on the surface of the cathode K of the fuel cell stack 300. To this end, other pipe connections of the anode and the cathode are also conceivable. The oxidizing agent conveyor 410 can be set up to dilute fuel which is discharged during the pressure relieving with ambient air. This can take place by way of the cathode or preferably by way of a cathode bypass 460. The cathode-side stack shut-off valves 430, 440 might then remain closed during the pressure relieving. The flow direction of the fuel and the ambient air are shown here by way of arrows. The fuel cell system is installed into a motor vehicle (not shown).

Figure 2:
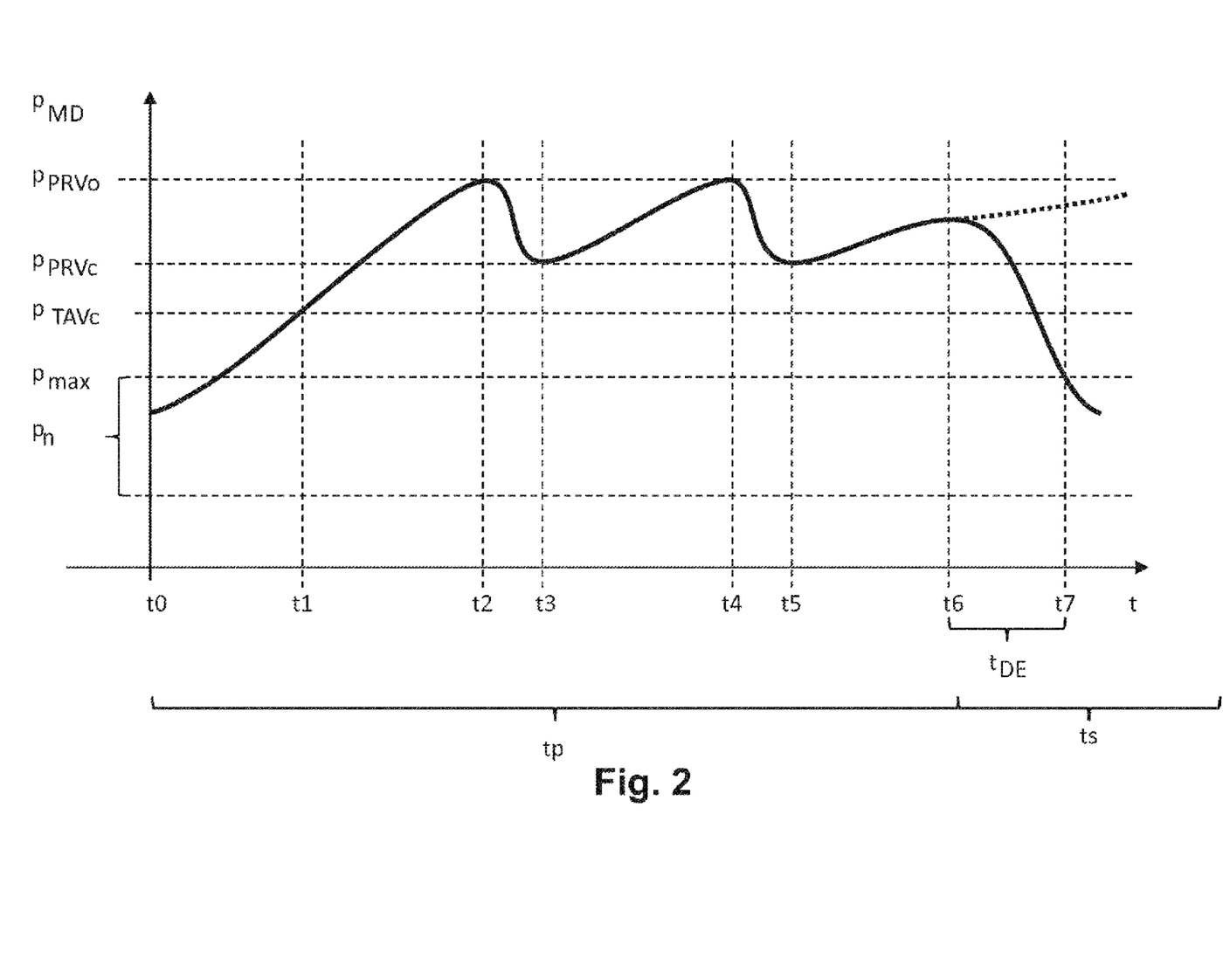
FIG. 2 is a highly schematic graph showing the temporal evolvement of the pressure value $p_{MD}$.

FIG. 2 very diagrammatically shows the temporal evolvement of the pressure value $p_{MD}$. Here, the pressure in the section MD serves as the pressure value. The fuel cell system was parked here at a time t0. On account of pronounced heating of the fuel cell system during the inactive phase, the pressure rises continuously. At the time t1, the pressure in the section MD reaches the limit pressure or pressure limit value $p_{T4Vc}$. From this time, the tank shut-off valve 210 is shut off for all further functions for safety reasons. It can be opened again only when an enabling operation has taken place. The pressure in the section MD rises further until, at the time t2, the triggering pressure $p_{PRVo}$ of the pressure relief valve which is provided in the section MD is reached. The pressure relief valve opens, and the pressure in the section MD decreases until the pressure has dropped at the time t3 to the closing pressure $p_{PRVc}$ of the pressure relief valve. After the closure, the pressure in the section MD here increases on account of the continuing heating once again to the triggering pressure $P_{PRVo}$ (time t4), and subsequently decreases again to the closing pressure $p_{PRVc}$ (time t5). Here, the pressure does not decrease to a pressure below the limit pressure of the tank shut-off valve. As a consequence, the tank shut-off valve will therefore always be shut off in the case of a starting procedure if the technology disclosed herein is not used. At the time t6, an enabling request is then issued, for example because a user wishes to start the motor vehicle. At this time, the method steps according to FIG. 3 are initiated.

Figure 3:
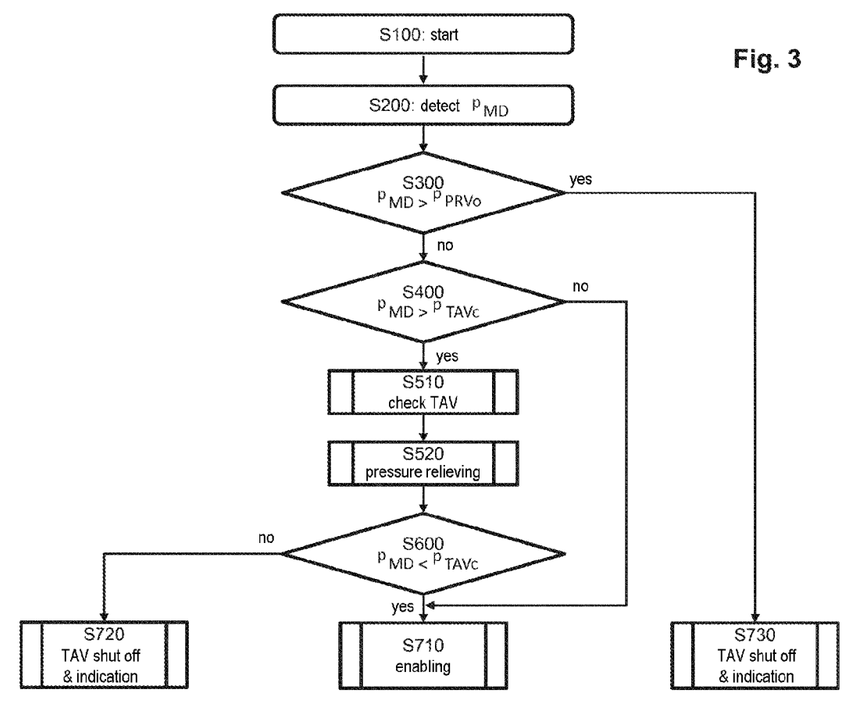
FIG. 3 is a flow chart showing one refinement of the method steps disclosed herein.

FIG. 3 diagrammatically shows one refinement of the method steps disclosed herein. The method disclosed herein begins with the step S100. In the step S200, the pressure value $p_{MD}$ in the section can be detected.

In the step S300, it can be determined whether the detected pressure value $p_{MD}$ (here, therefore the pressure in the section MD) is greater than the triggering pressure $p_{PRVo}$ of the pressure reducer 224. If this is the case, the fuel cell system or the tank shut-off valve 210 is or remains shut off, and a corresponding warning message is output to the user and/or to third parties (for example, a control center, for example via telemetry) (cf. step 730). This does not have to be implemented in this way, however.

If the detected pressure value $p_{MD}$ is in the meantime not greater than the triggering pressure $p_{PRVo}$, it can be determined in step S400 whether the detected pressure value $p_{MD}$ is greater than the pressure limit value $p_{TAVc}$ of the tank shut-off valve 210. If this is not the case, the enabling operation can take place (cf. step S710). If the detected pressure value $p_{MD}$ is in the meantime greater than the pressure limit value $p_{TAVc}$, the pressure has not dropped by way of the pressure relieving during the inactive phase of the fuel cell system as desired. Here, it has even risen noticeably (cf. FIG. 2). In this case (that is to say, $p_{TAVc} < p_{MD} < p_{PRVo}$), a check is first of all made here in step S510 as to whether the tank shut-off valve 210 is closed. If this is the case, the section MD is relieved of pressure in the step S520, here during the pressure relief time interval $t_{DE}$ (cf. FIG. 2). This can take place, for example, by virtue of the fact that the anode flush valve 238 is opened. At this time, the fuel cell system preferably does not provide any electric power to other electric consumers. Via the anode flush valve 238, the fuel passes into the cathode exhaust gas line 416, in which the fuel is diluted with ambient air (cf. FIG. 1). Other apparatuses for relieving the pressure are also conceivable, however. For example, a bypass line can branch off from the section MD and can open in the cathode exhaust gas line 416. During the pressure relieving, operations are carried out which bring about a reduction of the pressure value $p_{MD}$ in the section MD, if there is no malfunction. If, however, there is a malfunction which was also responsible, for example, for the pressure rise in the inactive phase, for example a defective pressure reducer 224, the pressure value also continues to rise in the pressure relief time interval $t_{DE}$ (cf. dotted line in FIG. 2). In the step S600, it is determined whether the detected pressure value $p_{MD}$ at the time t6 after the pressure relieving (here, after the pressure relief time interval $t_{DE}$) is smaller than the pressure limit value $p_{TAVc}$. If this is the case, the enabling operation can take place (cf. step S710). In this case, the pressure rise during the inactive phase of the fuel cell system is to be attributed to environmental influences and/or insignificant leaks which are not critical for the operation of the fuel cell system. A signal can nevertheless optionally be output. If the detected pressure value $p_{MD}$ is in the meantime greater than the pressure limit value $p_{TAVc}$, there is probably a malfunction. The fuel cell system or the tank shut-off valve 210 is then shut off or remains shut off in the step 720, and a corresponding warning signal is output to the user and/or to third parties (for example, a control center, for example via telemetry) (cf. step 720).

The preceding description of the present invention serves merely for illustrative purposes and not for the purpose of restricting the invention. Within the context of the invention, various amendments and modifications are possible, without departing from the scope of the invention and its equivalents.

LIST OF DESIGNATIONS

Fuel cell stack 300
Anode space A
Pressure vessel 200
Tank shut-off valve 210
Anode inflow path 215
Recirculation flow path 216
Second pressure reducer 222
First pressure reducer 224
Water separator 232
Anode flush valve 238
Recirculation jet pump 234
Recirculation conveyor 236
Anode flush line 239
Section MD
Low pressure section ND
Cathode space K
Oxidizing agent conveyor 410
Cathode inflow path 415
Heat exchanger 420
Feed line/stack shut-off valve 430
Exhaust gas/stack shut-off valve 440
Cathode exhaust gas path 416
Fuel cell bypass 460

What is claimed is:

1. A method for enabling a fuel cell system, comprising:
   detecting a pressure value which is indicative of pressure within a section of an anode subsystem, the section beginning downstream of a pressure reducer the pressure value being detected during an inactive phase of the fuel cell system;
   relieving pressure of the section if the pressure value is greater than a pressure limit value and there is an enabling request; and subsequently
   enabling the fuel cell system if the pressure value in the section after the pressure relieving is smaller than the pressure limit value, the enabling comprising transferring the fuel cell system from the inactive phase into an active operating state.

2. The method according to claim 1, wherein
   the pressure relieving takes place by having fuel flow out of the section directly or indirectly into an anode of a fuel cell stack of the fuel cell system.

3. The method according to claim 1, wherein
   the pressure relieving take place by having fuel flow out of the section directly or indirectly into an exhaust gas system of the fuel cell system.

4. The method according to claim 1, wherein
   a test is carried out before the pressure relieving and after the enabling request as to whether any possible tank shut-off valves are closed upstream of the pressure reducer, and
   the pressure relieving from the section takes place only if the possible tank shut-off valves are closed.

5. The method according to claim 1, wherein
   fuel which is discharged during the pressure relieving is converted catalytically on a catalytic converter surface.

6. The method according to claim 2, wherein
   the fuel which is discharged during the pressure relieving is converted catalytically on a catalytic converter surface.

7. The method according to claim 3, wherein
   the fuel which is discharged during the pressure relieving is converted catalytically on a catalytic converter surface.

8. The method according to claim 1, wherein
   the fuel cell system operates an oxidizing agent conveyor such that fuel is diluted before the fuel leaves the fuel cell system.

9. The method according to claim 2, wherein
   the fuel cell system operates an oxidizing agent conveyor such that the fuel is diluted before the fuel leaves the fuel cell system.

10. The method according to claim 3, wherein
    the fuel cell system operates an oxidizing agent conveyor such that the fuel is diluted before the fuel leaves the fuel cell system.

11. The method according to claim 1, wherein
the fuel cell system is enabled if the pressure value in the section after the pressure relieving is smaller than a maximum operating pressure limit value which may occur during an energy providing operation of the fuel cell system.

12. The method according to claim 1, wherein
a pressure relieving operation is not carried out, and the enabling already takes place after detecting the pressure value if the detected pressure value is smaller than the pressure limit value.

13. A fuel cell system, comprising:
at least one control unit, wherein the control unit is operatively configured to:
detect a pressure value which is indicative of pressure within a section of an anode subsystem, the section beginning downstream of a pressure reducer, the pressure value being detected during an inactive phase of the fuel cell system;
subsequently, relieve the pressure of the section if the pressure value is greater than a pressure limit value and there is an enabling request; and
subsequently, transfer the fuel cell system from the inactive phase into an active operating state if the pressure value in the section downstream of the pressure relieving is smaller than the pressure limit value.

14. A motor vehicle, comprising a fuel cell system according to claim 13.

* * * * *